US009819463B2

(12) United States Patent
Gage et al.

(10) Patent No.: US 9,819,463 B2
(45) Date of Patent: Nov. 14, 2017

(54) METHOD AND APPARATUS FOR TRANSMITTING DATA IN A WIRELESS COMMUNICATION SYSTEM

(71) Applicants: William Anthony Gage, Stittsville (CA); Aaron Callard, Ottawa (CA)

(72) Inventors: William Anthony Gage, Stittsville (CA); Aaron Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/047,231

(22) Filed: Feb. 18, 2016

(65) Prior Publication Data

US 2017/0244528 A1   Aug. 24, 2017

(51) Int. Cl.
*H04W 72/04*   (2009.01)
*H04L 5/00*   (2006.01)
*H04W 24/02*   (2009.01)
*H04W 76/02*   (2009.01)

(52) U.S. Cl.
CPC .......... *H04L 5/0053* (2013.01); *H04W 24/02* (2013.01); *H04W 76/023* (2013.01)

(58) Field of Classification Search
CPC ...... H04L 5/0053; H04L 69/04; H04W 24/02; H04W 76/023; H04W 28/18; H04W 80/06
USPC ................................. 370/328, 329; 455/428
See application file for complete search history.

(56) References Cited

U.S. PATENT DOCUMENTS

| | | | |
|---|---|---|---|
| 6,772,219 B1* | 8/2004 | Shobatake | H04L 49/602 370/351 |
| 6,788,652 B1* | 9/2004 | Hwang | H04L 1/16 370/282 |
| 9,445,368 B2* | 9/2016 | Nirantar | H04W 76/045 |
| 2004/0033801 A1* | 2/2004 | Yi | H04L 69/04 455/428 |
| 2005/0025181 A1* | 2/2005 | Nazari | H04W 48/08 370/469 |
| 2007/0060142 A1* | 3/2007 | Reznik | H04L 1/1854 455/445 |
| 2008/0123641 A1* | 5/2008 | Park | G06F 3/1209 370/389 |

(Continued)

OTHER PUBLICATIONS

3GPP TS 36.211, "Evolved Universal Terrestrial Radio Access Network (E-UTRAN); Physical Channels and Modulation", Jul. 3, 2015.

(Continued)

*Primary Examiner* — Afsar M Qureshi

(57) ABSTRACT

A method and apparatus for facilitating communication through a wireless communication system configured for transmission of general-purpose data, are provided. A transparent radio bearer is instantiated in a device and is configured to interface with an application of the device. A transparent logical channel is also instantiated in the device and is configured to interface with a medium access layer of the device. The medium access layer forms a part of a chain of protocol layers operatively configured to facilitate communications to another device associated with the wireless communication system. The transparent radio bearer maps onto the transparent logical channel in order to bypass at least one sub-layer of the chain of protocol layers while conveying data between the application and the medium access layer of the device.

22 Claims, 11 Drawing Sheets

(56) References Cited

U.S. PATENT DOCUMENTS

2012/0207100 A1* 8/2012 Hakola .............. H04W 76/023
370/329

OTHER PUBLICATIONS

3GPP TS 36.300, "Evolved Universal Terrestrial Radio Access Network (E-UTRAN); Overall description; Stage 2", Mar. 25, 2015.
3GPP TS 36.321, "Evolved Universal Terrestrial Radio Access Network (E-UTRAN); Medium Access Control (MAC) protocol specification", Jul. 8, 2015.
3GPP TS 36.322 "Evolved Universal Terrestrial Radio Access Network (E-UTRAN); Radio Link Control (RLC) protocol specification", Mar. 23, 2015.
3GPP TS 36.323 "Evolved Universal Terrestrial Radio Access Network (E-UTRAN); Packet Data Convergence Protocol (PDCP) specification", Jul. 8, 2015.
3GPP TS 36.331, "Evolved Universal Terrestrial Radio Access Network (E-UTRAN); Radio Resource Control (RRC) protocol specification", Jul. 8, 2015.
IETF RFC 7252, "The Constrained Application Protocol (CoAP)", Jun. 2014.
ETSI GS NFV-SWA 001, Network Functions Virtualisation (NFV); Virtual Network Functions Architecture, Dec. 2014.

* cited by examiner

350

```
Instantiate a transparent radio bearer (TRB) configured to interface with an
application

360
```

```
Instantiate a transparent logical channel (TLC) configured to interface with
a medium access layer of the device, wherein the TRB maps onto the TLC
in order to bypass at least one sub-layer of the chain of protocol layers
when conveying data between the application and the medium access layer

METHOD AND APPARATUS FOR TRANSMITTING DATA IN A WIRELESS COMMUNICATION SYSTEM

FIELD OF THE INVENTION

The present invention pertains to the field of wireless communications, and in particular to a method and apparatus for transmitting data in a wireless communications system that may avoid protocol overheads associated with conventional wireless communications.

BACKGROUND

In current wireless communication systems, such as the 3GPP Long Term Evolution (LTE) cellular system, there can be a significant amount of overhead required to transmit even a single bit of information between a wireless device and a corresponding application due to the many layers of protocol that are involved. Further, in order to exchange information across a physical layer channel, several stages of processing are required by lower layers of the protocol stack. This can result in wirelessly transmitted data being enveloped in several layers or sub-layers of protocol, with potentially separate headers added for each protocol layer or sub-layer.

However, when an application requires the transmission of short messages, the amount of overhead added by the protocol layers or sub-layers can be significant relative to the message length. This can result in inefficient use of communication resources.

Therefore there is a need for a method and apparatus for wireless communication that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for wireless communication using transparent logical radio channels.

In accordance with embodiments of the present invention, there is provided a method for facilitating communication by a device via a wireless communication system configured for data transmission. The method comprising: instantiating, in the device, a transparent radio bearer configured to interface with an application of the device; and instantiating, in the device, a transparent logical channel configured to interface with a medium access layer of the device, the medium access layer forming part of a chain of protocol layers operatively configured to facilitate wireless data communication with another device; wherein the transparent radio bearer maps onto the transparent logical channel in order to bypass at least one sub-layer of the chain of protocol layers while conveying data between the application and the medium access layer.

In accordance with embodiments of the present invention, there is provided an apparatus for data transmission via a wireless communication system. The apparatus comprising: a processor; a wireless communication interface coupled to the processor; and a memory communicatively coupled to the processor. The memory has stored thereon machine readable code which when executed by the processor performs the steps of: instantiating a transparent radio bearer configured to interface with an application operating on the apparatus; and instantiate a transparent logical channel configured to interface with a medium access layer of the apparatus, the medium access layer forming part of a chain of protocol layers operatively configured to facilitate wireless data communication with another device across the wireless communication interface; wherein the transparent radio bearer is mapped onto the transparent logical channel in order to bypass at least one sub-layer of the chain of protocol layers while conveying data between the application and the medium access layer of the apparatus.

In certain embodiments, the data is provided to the transparent logical channel from the medium access layer and passed to the transparent radio bearer for provision to the application, or provided to the transparent radio bearer from the application and passed to the transparent logical channel for provision to the medium access layer.

In various embodiments, data provided to the transparent logical channel from the medium access layer is passed directly to the transparent radio bearer, and/or data provided to the transparent radio bearer from the application is passed directly to the transparent logical channel.

BRIEF DESCRIPTION OF THE FIGURES

Further features and advantages of the present invention will become apparent from the following detailed description, taken in combination with the appended drawings, in which:

FIG. 3B illustrates a method for facilitating communication by a device through wireless communication system in accordance with an embodiment of the present invention;

It will be noted that throughout the appended drawings, like features are identified by like reference numerals.

DETAILED DESCRIPTION

Embodiments of the present invention are directed towards a method and apparatus for facilitating communication by a device via a wireless communication system configured for transmission of data, such as general-purpose data. A transparent radio bearer is instantiated in the device and is configured to interface with an application. A transparent logical channel is also instantiated in the device and is configured to interface with a medium access layer of the device, the medium access layer forming part of a chain of protocol layers operatively configured to facilitate wireless data communication. In accordance with the method and functionality of the associated apparatus, data is exchanged between the medium access layer and the application through the transparent logical channel and the transparent radio bearer across at least one sub-layer of the protocol stack. For example, data provided to the transparent logical channel from the medium access layer is passed to the transparent radio bearer for provision to the application, and data provided to the transparent radio bearer from the application is passed to the transparent logical channel for provision to the medium access layer. In various embodiments, data provided to the transparent logical channel from the medium access layer is passed directly to the transparent radio bearer, and/or data provided to the transparent radio bearer from the application is passed directly to the transparent logical Channel.

Embodiments of the present invention provide for a reduced protocol stack operation in a wireless communication system. One or more protocol sub-layers, such as upper-Layer 2 protocols, may be bypassed or omitted. Embodiments of the present invention provide for a variable-size protocol stack, in which data transmissions may optionally bypass one or more protocol sub-layers or layers when operating in a bypass mode, for example when this is deemed beneficial by an application or management module. A transparent radio bearer communicatively coupled to a transparent logical channel are instantiated and used as required to facilitate the protocol bypass.

As used herein, a device may refer to either a wireless device or a Radio Edge Node (REN). A wireless device includes, but is not necessarily limited to, a User Equipment (UE), Mobile Station, Fixed Station, Mobile Node, Human-Type Communications Device, Machine-Type Communications Device, or other untethered end node. Radio edge node A REN may be, but is not necessarily limited to, an Access Point, evolved NodeB, Base Station, Access Router, Radio Network Controller, or other radio access controller An apparatus refers to a device or a particular portion thereof.

Figure 1A:
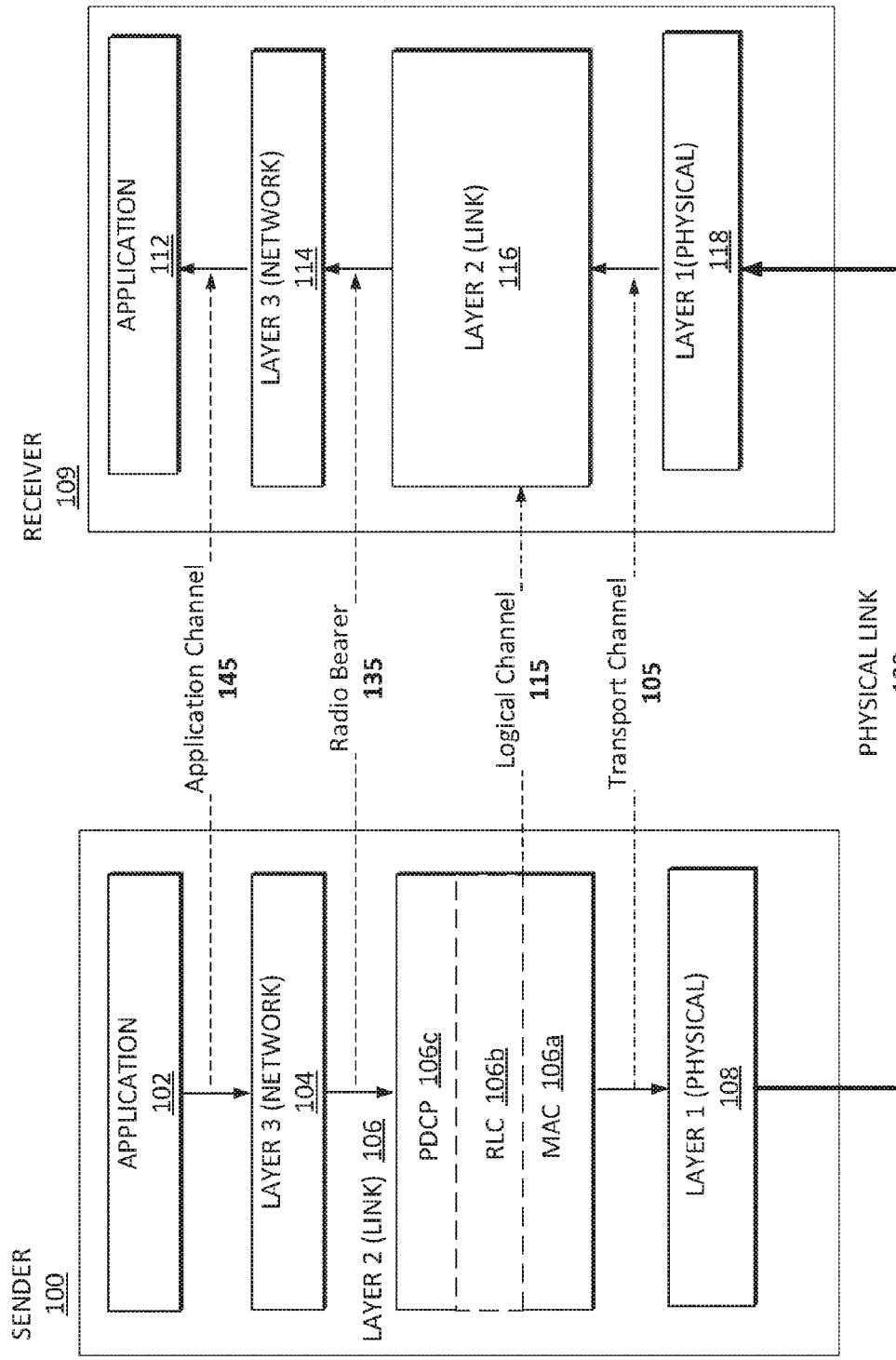
FIG. 1A illustrates a layered protocol model used for wireless communications between devices, in accordance with the prior art.

FIG. 1A illustrates a wireless network communication between a sender 100 and a receiver 109 both operating under a layered protocol model (i.e. protocol stack) in accordance with the prior art. The sender 100 operates under a protocol stack comprising an application layer 102, a network layer 104 (i.e. Layer 3), a link layer 106 (i.e. Layer 2), and a physical layer 108 (i.e. Layer 1). The link layer 106 further comprises a packet data convergence protocol (PDCP) sub-layer 106c, a radio link control (RLC) sub-layer 106b, a medium access control (MAC) sub-layer 106a. Similarly, the receiver 109 comprises a corresponding protocol stack including an application layer 112, a network layer 114 (Layer 3), a link layer 116 (Layer 2), and a physical layer 118 (Layer 1). The sender 100 and receiver 109 are communicatively coupled through physical link 128 (i.e. "Radio Link") in order to transmit data therebetween. Layer 1 108 includes the Radio Interface layer and associated protocols, Layer 2 106 includes data link protocols and medium access control procedures, Layer 3 104 includes network connectivity, data transport and mobility management protocols, and the application layer 102 includes application-specific procedures and protocols.

As understood by those skilled in the art, each of the respective layers (or sub-layers) of the sender 100 and receiver 109 may only communicate to each other through their respective protocol stack. For example, if application 102 of sender 100 wishes to transmit a message to application 112 of receiver 109, the message must pass through network layer 104, link layer 106, and physical layer 108, where each layer performs respective processing/encapsulation to the message. The message is then transmitted to the receiver 109 across the physical link 128, where physical layer 118, link layer 116, and network layer 114 perform further processing/decapsulation to retrieve the original message for application 112. In this way the message is conceptually (i.e. "virtually") transmitted between application layers 102, 112 via the application channel 145. In the same way, a message from network layer 104 to network layer 114 is conceptually passed through radio bearer 135 via protocol stack operation. While the protocol stack model organizes communications in a modular fashion between corresponding layers (and sub-layers), a large amount of overhead is created as each layer adds/appends further data to each message prior to transmission across the physical link 128.

Figure 1B:
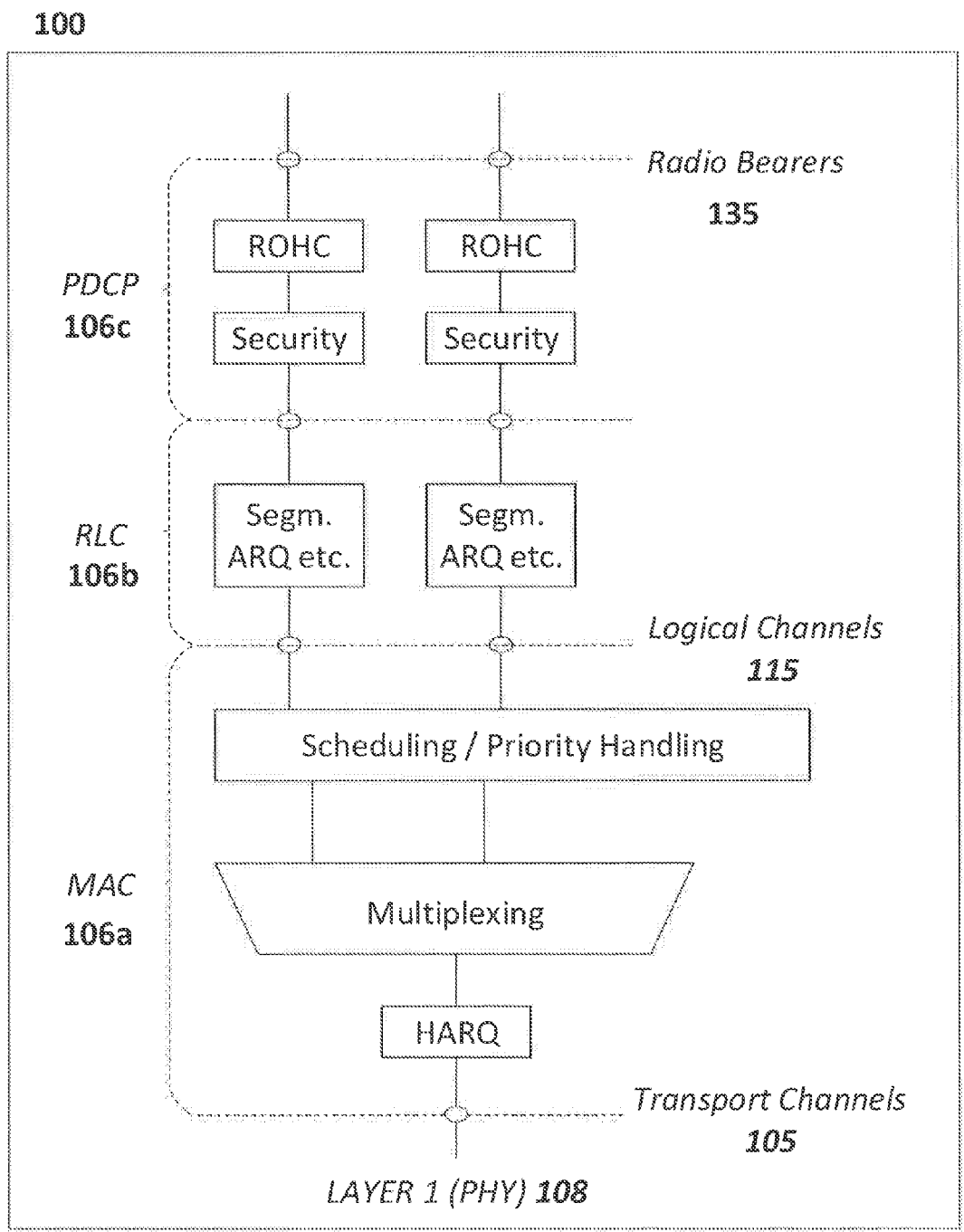
FIG. 1B further illustrates Layer 2 processing of the Link layer in FIG. 1A, for a 3GPP LTE communication system in accordance with the prior art.

FIG. 1B further illustrates the Link layer 106 processing of the sender 100 in FIG. 1A, that would be required for operation as an LTE communication device in accordance with the prior art, for example as set forth in 3GPP TS 36.300, "Evolved Universal Terrestrial Radio Access Network (E-UTRAN); Overall description Stage 2", http://www.3gpp.org/DynaReport/36300.htm. Similar to that shown in FIG. 1A, the Link layer 106 further includes a Media Access Control (MAC) sub-layer 106a that performs (in addition to scheduling) error correction (through Hybrid Automatic Repeat Request (HARQ) and multiplexing of potentially multiple logical control and data channels onto physical (PRY) layer transport channels, a Radio Link Control (RLC) sub-layer 106b that performs segmentation and reassembly of upper layer packets, retransmission to recover from segment losses, and reordering to compensate for out-of-order segment reception due to HARQ, and a Packet Data Convergence Protocol (PDCP) sub-layer 106c that performs Internet Protocol (IP) packet header compression and decompression, security (integrity protection and ciphering), and support for packet reordering and retransmission during handover. Each sub-layer (106a, 106b, 106c) may add a header to the Layer 2 Protocol Data Unit (PDU) transmitted by the PHY layer 108 in order to manage the flow of information with its peer on the other side of the physical link 128. Radio bearers 135 are provided as channels which communicate with higher layers and/or applications (e.g. for network layer 104 to communicate with network layer 114 across the physical link 128). Data is conveyed between the logical channels 115 and transport channel 105 for connecting the RLC and MAC sub-layers 106b, 106a to their peer sub-layers not shown) across the physical link 128.

It is noted that the IP protocol is used widely in Layer 3 wide-area data communications technologies. For example, IPv6 is expected to form the basis of next generation wireless networks in order to facilitate deployment of large numbers of Machine Type Communication (MTC) devices. While an IPv6 header size can be about 40 bytes, Layer 2 protocols such as Robust Header Compression (ROHC) can be used to compress the header for a packet flow over a radio access link. For example, an IPv6 header plus a TCP, UDP, or UDP plus RTP header can be compressed to about three or four bytes. It is also noted that applications can vary widely in the overheads introduced by their protocols, For example, the Constrained Application Protocol (CoAP) described in IETF RFC 7252 can include a header overhead of 4-8 bytes, a resource ID of 2-256 bytes, and a 1 byte payload marker. As such, it is observed that conventional IP-centric wireless systems, such as LTE, often assume that all wireless devices are IP-aware and incorporate a substantial IP protocol stack. Bandwidth optimisations such as ROHC and protocol enhancing proxies are then applied against an assumed IP packet and its encapsulated protocols. The above protocols may potentially add significant overhead to transmission of small amounts of data which may result in a commensurate increase in bandwidth and expended energy.

To address overhead issues in conventional systems such as those described above, embodiments of the present invention are configured, when invoked, to limit the overhead attached to data transmitted over a wireless physical link (e.g. radio link). This is performed by avoiding or bypassing the conventional layered approach of adding multiple protocol headers on top of each other. In some embodiments, the conventional approach, with all of its associated layers, can still be in place and usable for types of communication that would benefit from it, such as longer conventional messages. In some embodiments, device software requirements and associated cost and/or complexity can be reduced by avoiding requirements to implement protocols that do not add value to the wireless communication for a particular device, such as a very low cost MTC device, also referred to as Machine-to-Machine devices. For example, in such devices, various layers or sub-layers and their protocol overheads may be omitted thereby reducing bandwidth requirements. In addition, omitting operation of certain protocols, sub-protocols, layers or sub-layers may improve energy efficiency due to reduced amounts of data processing and reduced number of bits transmitted.

Embodiments of the present invention may be applied in scenarios where relatively small amounts of data are intended to be transmitted. For example, an MTC device may be configured to transmit sensor readings periodically, where each sensor reading represented by a limited number of bits, for example on the order of 10 bits. As another example, a device may be configured to periodically report a status using a limited number of bits. For example, the status report may be a binary value, indicative of an on or off, open or closed, alive or dead state, etc. Another potential application is the transmission of short messages such as keep-alive messages utilized by various applications. More generally, embodiments of the present invention are used to transmit and/or receive small amounts of data that is interpreted in an application-specific or context-specific manner thereby bypassing the requirement for protocol headers to interpret the data or to define the context.

Embodiments of the present invention may facilitate a reduction in the amount of radio resources required to transmit data across the radio link, for example since one or more protocol layers are bypassed. Further, processing overhead at both the radio edge node and the wireless device may be reduced due to bypassing of protocol layers. Yet further, software and/or firmware complexity may be reduced, for example when protocol layers can be omitted entirely in a dedicated low cost MTC device. Yet further, the amount of state information retained by a radio edge node may be reduced in some embodiments.

Embodiments of the present invention allow for an application to establish a transparent radio link connection in which data (in the form of unadorned bits received from the application, for example) can be transmitted and received through the PHY layer. The application may reside only on a wireless device or only in the network, or may consist of corresponding wireless device- and network-based component applications. The data may be transmitted over the radio link in an efficient manner, for example using modulation and coding schemes such as those set forth in the 3GPP Long Term Evolution (LTE) standard and similar wireless communication standards.

As such, embodiments of the present invention provide a method and apparatus for conveying data across a radio link, the method comprising mapping (and the apparatus configured to map) data provided by an application directly onto radio resources provided by the radio link PHY layer. The data mapped directly onto radio resources may comprise transmit information associated with the data provided to the transparent radio bearer from the application, receive information associated with the data provided to the transparent logical channel from the medium access layer, or both. In some embodiments, the transmit and receive information are mediated by at least a portion of the MAC layer. Data to be provided to the application may be similarly mapped in the reverse direction.

Figure 2A:
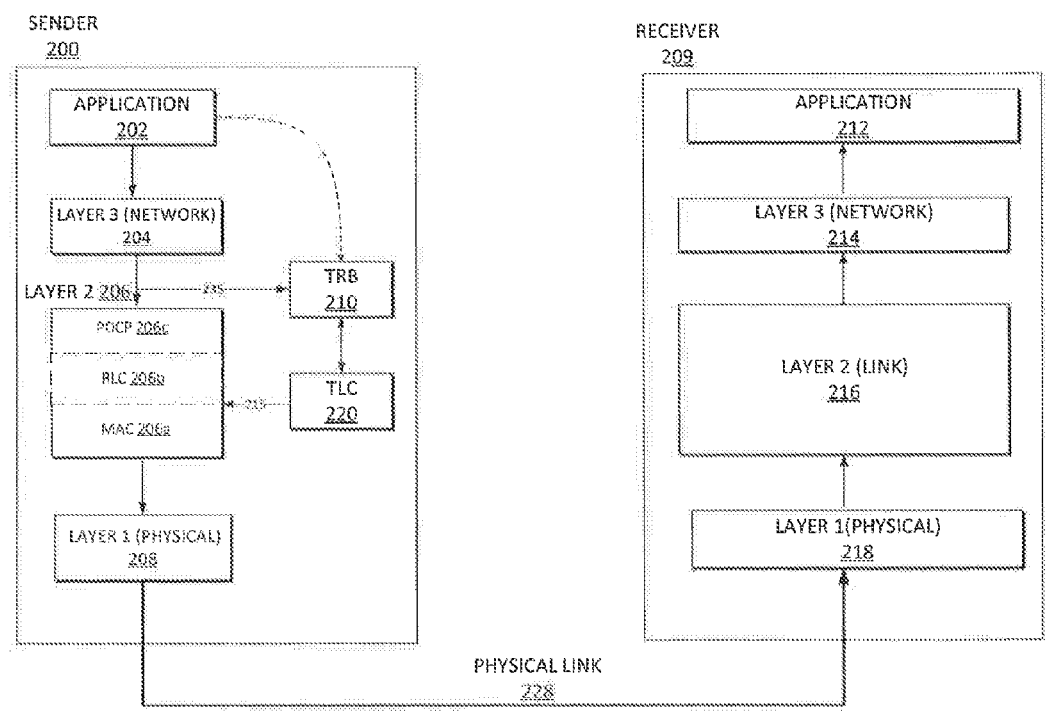
FIG. 2A illustrates a wireless communication using the layered protocol model, in accordance with an embodiment of the present invention.

FIG. 2A illustrates data communication between a first device 200 and a second device 209, in accordance with an embodiment of the present invention. The first and second devices 200, 209 operate in accordance with a protocol stack comprising application layers 202, 212, network layers 204, 214, link layers 206, 216, and physical layers 208, 218, respectively. The link layer 206 fluffier comprises a sub-layer 206c, an RLC sub-layer 206b, and a MAC sub-layer 206a. The first device 200 is communicatively coupled to the second device 209 via physical link 228, which may comprise a radio link or other wireless link for transmitting data therebetween. A transparent radio bearer (TRB) 210 is instantiated (for example, by application 202) for communicating with the application 202 or network layer 204 above. Similarly, the transparent logical channel (TLC) 220 is instantiated to communicate with the MAC sub-layer 206a below. The TRB 210 maps onto the TLC 220 in order to convey data therebetween and bypass the overhead associated with the PDCP and RLC sub-layers 206c, 206b, as otherwise required under conventional protocol stack operation. Reduced transmission bandwidth and processing overhead may be achieved through bypassing one or more sub-layers of the link layer 206, as otherwise required under protocol stack operation.

Figure 2B:
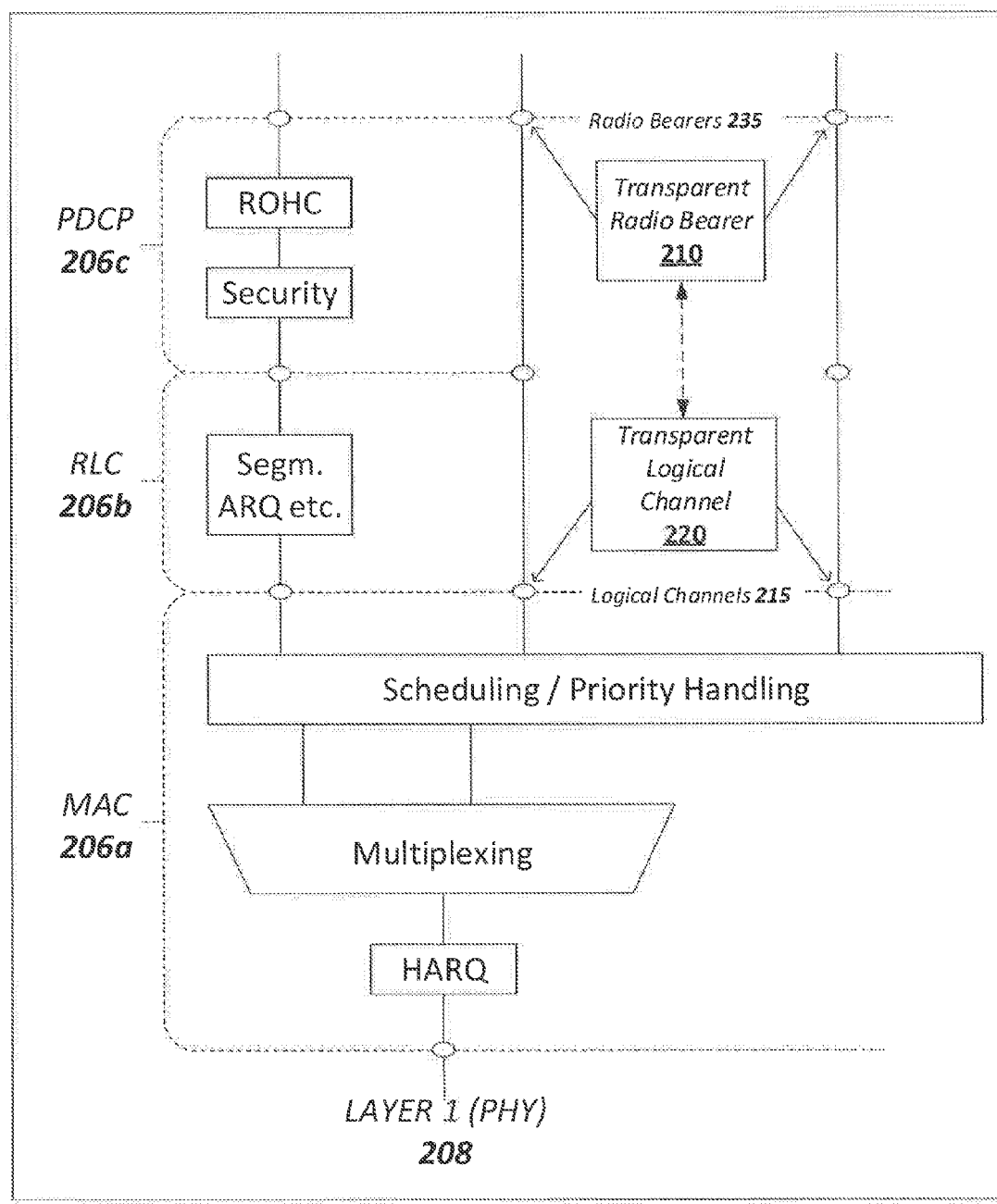
FIG. 2B further illustrates Layer 2 processing of the wireless communication shown in FIG. 2A, in accordance with an embodiment of the present invention.

FIG. 2B further illustrates Link layer processing in a device, in accordance with another embodiment of the present invention. A TRB 210 is instantiated in the device for use in communication with a corresponding application (not shown). An application may trigger the instantiation of the TRB 210. The TRB 210 then maps onto an associated TLC 220, which in turn can convey the information to the MAC sub-layer 206a, and in turn the PHY layer 208 and across the radio link (not shown). Multiple TRBs and TLCs may be established, if required (not shown). Data passing between the TRB 210 and TLC 220 in either direction bypasses some or all of the conventionally applied operations of the PDCP 206c and RLC 206b sub-layers. The application interfaces with the TRB 210, while the MAC layer 206a interfaces with the TLC 220. Accordingly, through bypassing various sub-layers (and their associated protocol overheads), a reduced protocol stack is achieved having lower bandwidth requirements.

In various embodiments, the TRB maps onto the TLC, and the TLC maps onto physical transport channels.

Between the TRB-to-TLC interface and the TLC-to-MAC interface, adding of packet header data may be avoided or mitigated.

In some embodiments, data received at a TRB service access point are delivered substantially as-is across the air interface to the corresponding TRB service access point. In some embodiments, for each TLC, an efficient delivery means available from the PHY layer is selected and used.

In some embodiments, Layer 2 protocols above the MAC, layer are bypassed or omitted. For example, operations conventionally applied by the RLC and PDCP sub-layers are absent for at least some communications. However, in some embodiments, error detection and/or correction residing in the MAC layer, for example via HARQ, may be applied. Further, in some embodiments, TLC MAC PDUs may be multiplexed with MAC control PDUs and MAC data PDUs from other logical channels for transmission through the PHY layer. Yet further, in some embodiments TRBs associated with mobile devices may be handed-over. By way of example, such features are illustrated in FIG. 2B by the connection of the TLC 220 to the conventional functionality of the LTE MAC sub-layer 206a.

Figure 3A:
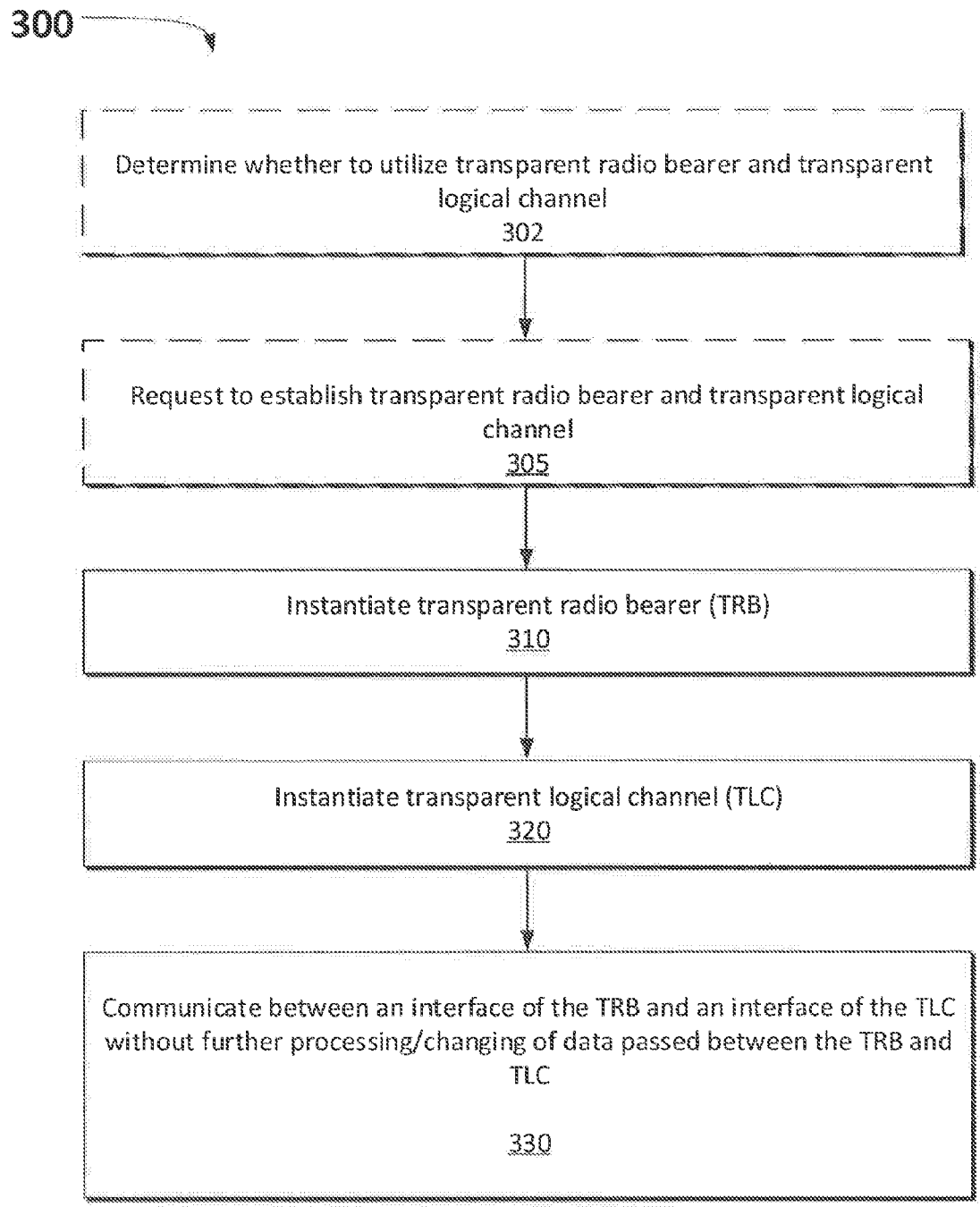
FIG. 3A illustrates a method for wireless communication in accordance with an embodiment of the present invention.

In accordance with an embodiment of the present invention, and with reference to FIG. 3A, there is provided a method 300 for wireless communication. The method 300 includes instantiating 310 a transparent radio bearer (TRB). The TRB may be established in response to a request 305 which may be generated by an application that is co-located with the wireless device or that is located on the network-side of the radio link. The method further includes instantiating 320 a transparent logical channel (TLC) communicatively coupled to the TRB. The TLC may be established between a radio edge node and the wireless device using Radio Resource Control (RRC) signalling, for example as set forth in 3GPP TS 36.331, "Evolved Universal Terrestrial Radio Access Network (E-UTRAN); Radio Resource Control (RRC) protocol specification", http://www.3gpp.org/DynaReport/36331.htm.

The method further includes communicating 330 between an interface of the TRB and an interface of the TLC without further processing, such as by additional Layer 2 protocols. As such, data may be passed between the application and the medium access layer without further encapsulation or addition of further header information, control information, or the like.

The TRB is a type of radio bearer, such as a radio bearer specified in 3GPP TS 36.300. A radio bearer may be used to transfer either user data or control data, as would be readily understood by a skilled person in the ordinary technical field.

The TLC is a type of logical channel, such as a logical channel specified in 3GPP TS 36.300. A logical channel is mapped to a physical channel, and is used to communicate certain types of information over the physical channel, as would be readily understood by a skilled person in the ordinary technical field.

The method further includes communicating via a wireless communications channel using the established TIRE, TLC, and physical channel associated therewith. For example, the TLC may provide data to a MAC layer, which interacts with a PHY layer to wirelessly communicate information to a destination device. The MAC layer may also receive data from the PITY layer and provide the received data to the TLC. Details of protocol-specific MAC and PRY layer operations would be readily understood by a skilled person in the ordinary technical field. The wireless communication channel is a general-purpose data communication channel, such as a LTE data channel or a general-purpose data channel of a comparable communication system in which upper-Layer 2 protocols are typically implemented. This is in contrast to dedicated wireless communication channels.

In some embodiments, the method 300 further includes determining 302 whether to utilize the TRB and TLC for use in communication, or whether to use a different mode of communication, such as one which does not bypass the Layer 2 protocols above the MAC layer, but instead uses one or more additional protocols. Such a determination may be made by the application or by a management module of the wireless device or radio edge node. More particularly, a determination may be made as to whether to bypass a portion of a chain of protocol layers, the portion corresponding to the one or more additional protocols. The determination corresponds to selecting whether to utilize the TRB and the TLC for the data communication or to utilize the portion of the chain of protocol layers for the data communication. For example, when the number of bits to be transmitted and/or received is below a predetermined threshold, the TRB and TLC may be established and used due to an expected gain in efficiency for small amounts of data. In contrast, when the number of bits to be transmitted and/or received is larger than the threshold, the different mode of communication may be used. In some embodiments, when the number of bits to be transmitted and/or received is below the threshold and the timing of the transmission is delay intolerant, the TRB and TLC may be used. In contrast, when the timing of the transmission is sufficiently tolerant to delay, the data may be held and aggregated with additional data to be transmitted until the aggregation is larger than the threshold, or until additional delay is no longer tolerable. The TRB and. TLC may be pre-existing or established on an as-needed basis. In various embodiments, certain information, for example as provided by the application, is transmitted as data using the TRB and TLC. The data may be transmitted as bits mapped directly onto radio resources provided by a PHY layer of a radio link of the wireless communications system.

In various embodiments, when a portion of a chain of protocol layers is bypassed, one or more functions of the bypassed portion of the chain of protocol layers may be performed by the application, or network element other than the radio edge node.

In some embodiments, different layers of the protocol stack may be processed on different network elements that are communicatively coupled.

In some embodiments, the TRB may be an indicator TRB which is configured to facilitate communication of data in the form of a binary value (e.g., 0 or 1) across a radio link. Correspondingly, the indicator TRB may be coupled to a TLC that is mapped onto a PHY on-off signal (OOS). A PHY OOS may be, for example, a Zadoff-Chu sequence, a Gold sequence, or a BPSK signal. In some embodiments, presence of the PHY OOS may indicate a first binary condition, such as an "on" condition, while absence of the PHY OOS may indicate a second binary condition, such as an "off" condition.

In some embodiments, the TRB may be a block TRB which is configured to facilitate communication of data in the form of a plurality of bits across the radio link. The number of bits required for communication by the application may be limited to a maximum number $N_{app}$ while the number of bits that can be communicated via a block TRB may be limited to a maximum number $N_{max}$. When the TRB is instantiated, the REN ensures that $N_{app}$ is less than or equal to $N_{max}$. The value of $N_{max}$ may depend at least partially on the PHY layer implementation, in some embodiments, a block TRB communicating a single bit may be equivalent to an indicator TRB.

In some embodiments, the transparent logical channel coupled to a block TRB may be mapped onto a PHY PDU such as an LTE transport block or similar structure. For example, in one LTE radio resource block, for a Modulation and Coding Scheme (MCS) index of 7 (corresponding to QPSK modulation), $N_{max}$ may equal 107 bits. For a MCS index of 14 (corresponding to 16-QAM), $N_{max}$ may equal 256 bits. For a MCS index of 21, (corresponding to 64-QAM), $N_{max}$ may equal 488 bits. The MCS to be used, and hence the value of $N_{max}$, may be determined when the TRB is instantiated and may be based, for example, on the type of Wireless device or on the location of the Device. In some embodiments, the PHY transport block may be used to directly represent the unadorned bits to be transmitted.

In accordance with another embodiment of the present invention, and with reference to FIG. 3B, there is provided a method 350 for facilitating communication by a device via a wireless communication system configured for transmission wireless data, such as general purpose data. The method 350 includes at step 360, instantiating a transparent radio bearer (TRB) configured to interface with an application, for example on a device. At step 370, instantiating a transparent logical channel configured to interface with a medium access layer of the device. The medium access layer may form a part of a chain of protocol layers operatively configured to facilitate wireless data communication to another device through the wireless communication system. When exchanging data with the other device via the wireless communication system, the transparent radio bearer maps onto the transparent logical channel in order to bypass at least one sub-layer of the chain of protocol layers while conveying data between the application and the medium access layer of the device.

Figure 4:
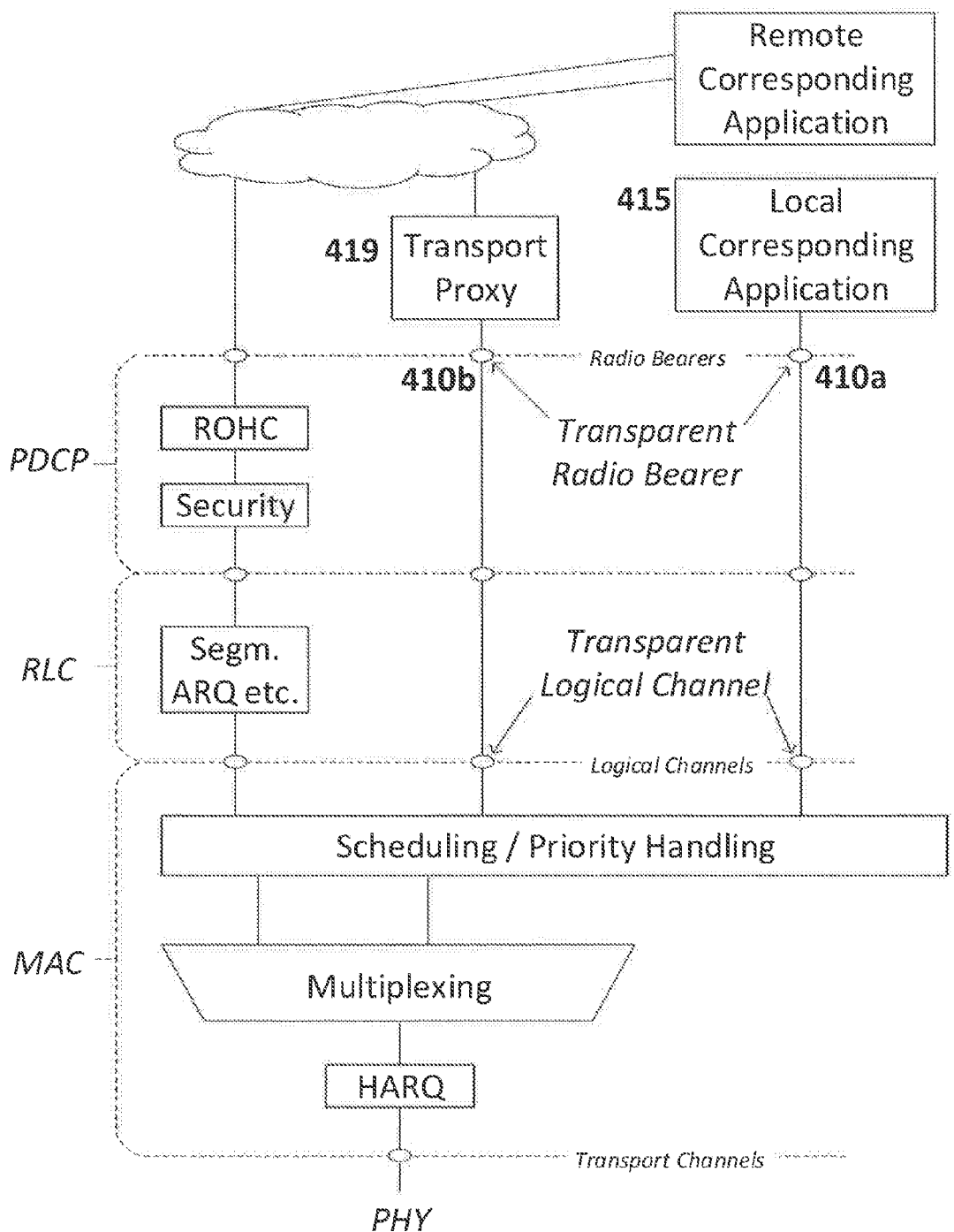
FIG. 4 illustrates operation of an embodiment of the present invention at a radio edge node.

FIG. 4 illustrates operation of an embodiment of the present invention at a radio edge node. Two scenarios are illustrated. In the first scenario, the transparent radio bearer 410a is associated with, and communicatively coupled to, a local corresponding application 415. The local corresponding application refers to an application running on processing equipment which is local to the radio edge node. For example, the local corresponding application may be co-located with the REN, or connected to the REN via a dedicated link. The local corresponding application may be running on computing hardware that is integral or directly coupled to the radio edge node. If the radio edge node is established at least partially using Network Function Virtualization (NFV), the local corresponding application may be hosted by the same generic computing equipment as is being used to establish the radio edge node. For a local corresponding application 415, communication between the radio edge node and the application may not require a Layer 3 protocol. The radio edge node may be configured to operate applications thereon, for example by inclusion of an operating system on which external applications may be installed.

In the second scenario, the transparent radio bearer 410b is associated with, and communicatively coupled to, a remote corresponding application 417. The remote corresponding application refers to an application running on processing equipment which is separate from the radio edge node. For example, the remote corresponding application may be located on another wireless network element or on an application server communicatively coupled to the radio edge node via the Internet or another network. In other embodiments, the remote corresponding application may comprise multiple functional components that are located on different network elements, and are communicatively coupled. As such, communication between the radio edge node and the remote corresponding application may require a Layer 3 protocol.

In some embodiments, when one or more Layer 3 protocols are required for facilitating communication between the radio edge node and the corresponding application, a transport proxy 419 may be used to encapsulate and/or de-capsulate data for carriage across the network. The transport proxy may communicate with the transparent radio bearer in a manner similar to a local corresponding application, for example by directly providing data thereto and receiving data therefrom, the data being configured absent of one or more protocol layers. The transport proxy uses one or more applicable protocols, such as but not limited to the IP protocol, to prepare and send the data for transmission to the remote corresponding application. The transport proxy also receives transmissions from the remote corresponding application, the transmissions using the applicable protocols, extracts data from the received transmissions, and provides the extracted data the transparent radio bearer. Notably, the transport proxy may facilitate reduction in the number of bits transmitted over the wireless link by extracting data from the transmissions and excluding associated header and other protocol information.

In some embodiments, the transport proxy 419 may provide a translation between information exchanged with the remote corresponding application and data transmitted over the transparent radio bearer. In some instances, this translation may be based on application-specific context. For example, the binary value "1" transmitted over a TRB may be interpreted by one application-specific proxy as "open" but the binary value "1" transmitted over a different TRB may be interpreted by a different application-specific proxy as a "keep alive" signal.

In some embodiments, one, some or all Layer 2 protocols may be bypassed or omitted such that information associated with these protocols is not conveyed over the air interface. In other words, data is transmitted over the air interface in absence of header or control data associated with these protocols. In some embodiments, Layer 3 protocol headers may be added and removed by a transport proxy module 419 which is located on the network side of the TRB, for example directly communicatively coupled to the TRB and between the TRB and served applications and/or higher layers of the protocol stack. In some embodiments, the transport proxy module 419 may also add and remove application protocol headers and control information.

Figure 5:
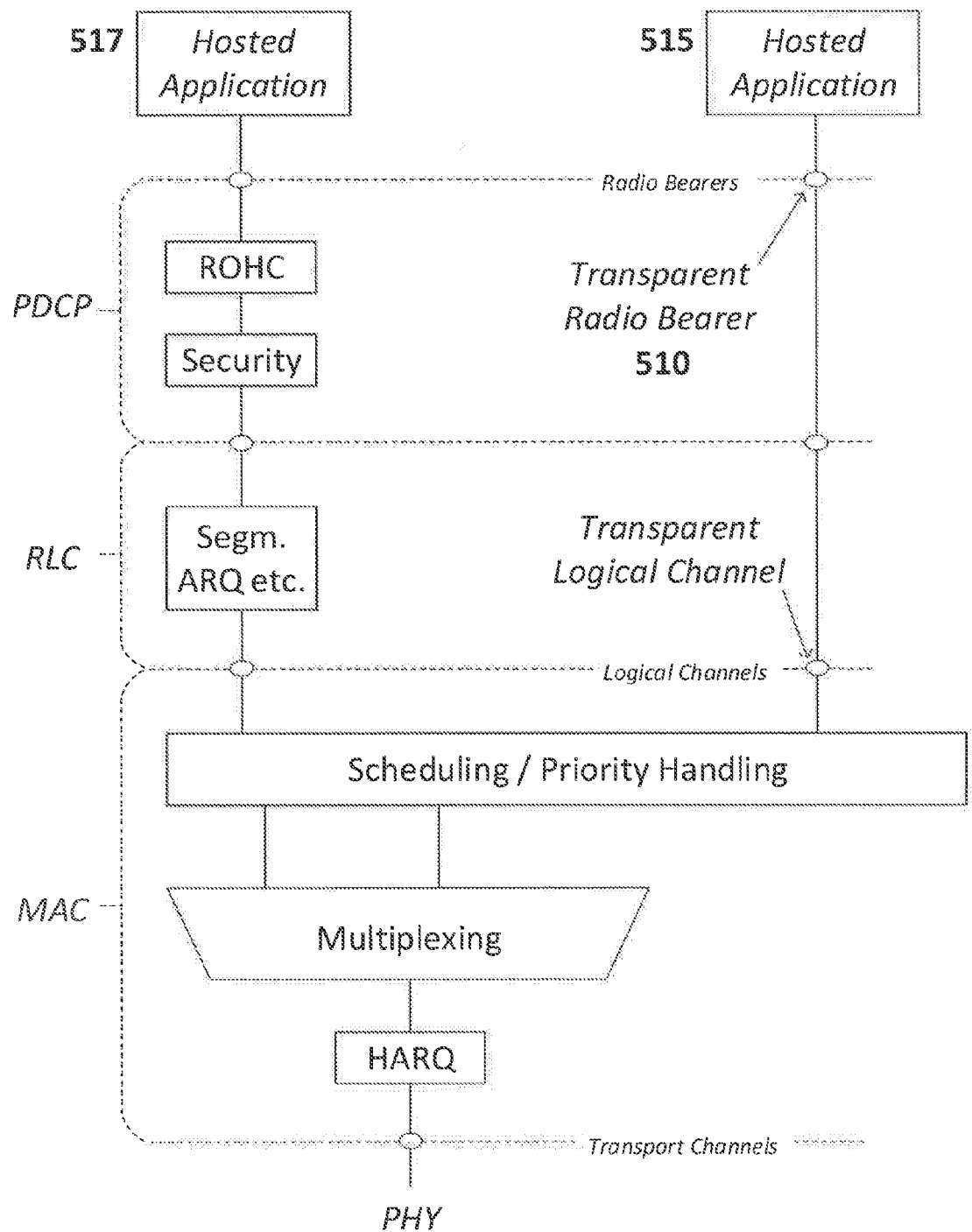
FIG. 5 illustrates operation of an embodiment of the present invention at a wireless device.

FIG. 5 illustrates operation of an embodiment of the present invention at a wireless device. The transparent radio bearer 510 is associated with, and communicatively coupled to, a hosted application 515. The hosted application is typically an application running on the wireless device. For example, the application may use an operating system socket to communicate with the radio link interface via the transparent radio bearer. A second hosted application 517, which may be another aspect of the hosted application 515, is illustrated, which uses the full Layer 2 protocol stack. Alternatively, if the upper portion of the Layer 2 protocol stack is omitted, such a hosted application 517 may not be supported.

In some embodiments, a first application, being the hosted application associated with the wireless device, and a second application, being the local or remote corresponding application associated with the radio edge node, may be configured to communicate with each other. The first and second applications may be portions of a single distributed application. In particular, the first and second applications may bypass some or all Layer 2 protocols typically used in the applicable wireless communication environment and use an end-to-end protocol. In some embodiments, an end-to-end protocol, implemented by the hosted application and corresponding application, may be used for one or more of: encryption; authentication; segmentation and reassembly; and error detection and correction. As such, these functionalities as provided by the existing Layer 2 protocol are not required, as they are handled by the application instead.

In some embodiments, the hosted application may provide Layer 2 protocol functionality, and then forward data to a second hosted application which lacks the Layer 2 functionality.

It is considered herein that the transparent radio bearer at a wireless device can also be associated with a remote corresponding application, similarly to the radio edge node, according to certain embodiments. For example, the remote corresponding application may be associated with a personal wearable device that is communicatively coupled to the wireless device.

In some embodiments, a TRB may be defined as uplink only, downlink only, or bidirectional. An uplink-only or bidirectional TRB is usable to transmit data in the uplink direction from the wireless device to the network, while a downlink-only or bidirectional TRB is usable to transmit data in the downlink direction from the network to the wireless device.

In some embodiments, the TRB may be configured to operate as a downlink multicast bearer. The downlink multicast bearer may be configured within the communication system such that data provided thereby is multicast to multiple wireless devices. Configuration of radio bearers in general to operate in a multicast mode may be performed in a manner which depends on the particular implementation of the host wireless communication system. The radio edge node may be provided with a list of wireless devices authorized to receive information over the corresponding multicast TLC. This information may be provided for example during configuration of the TRB, or separately through another means. In some embodiments, rather than a multicast TLC, a set of unicast TLCs may be established and coupled to the multicast TRB.

In some embodiments, the TRB may be configured to operate as an uplink group bearer. The radio edge node may be provided with a list of wireless devices which are authorized to transmit information over the corresponding TLC or set of TLCs coupled to the TRB. This list may be provided during configuration of the TRB or separately through another means.

In some embodiments, configuration of a TRB may include instructions to include additional information in uplink data, and configuring the transport proxy may include instructions to include additional information in the uplink data packets transmitted thereby to the remote corresponding application. For example, the additional information may be a tag or identifier specified by the remote corresponding application that is to be included in the payload of a packet. The additional information may also include information that is to he included in a packet header such as a source and/or destination TCP/UDP port number and a destination IP address, or a service function chain identifier. The additional information may be used to facilitate processing of data at the remote corresponding application and/or by elements in an intervening network.

In some embodiments, configuration of a TRB may include providing instructions to include dynamically derived information in uplink data, and configuring the transport proxy may include instructions to include dynamically derived information in uplink data packets transmitted thereby to the remote corresponding application. For example, the dynamically derived information may include one or more of: a device identifier; a timestamp reflecting the arrival or initial transmission of the information from the Device; a sequence number indicating order of transmissions/receptions; an identity of the serving Radio Access Network and/or radio edge node; a current geographical location of the Device; a schedule of radio link transmission opportunities associated with the Device; and a service function chain identifier. As such, the TRB and/or the transport proxy may be configured using static or dynamic information.

In some embodiments the entity which sets up and configures the TRB and/or the transport proxy may be a separate entity from the remote/local corresponding application.

In some embodiments, a TLC may be configured to convey application-specific signalling information between a radio edge node and a wireless device. In this case, the corresponding application coupled to the radio edge node may be directly associated with the radio edge node.

In some embodiments, a TLC may be used to support a multi-link connection in which transport and/or security services are provided end-to-end by the applications across all radio access connections. In some embodiments, the connection may be support multiple radio access technologies.

Figure 6:
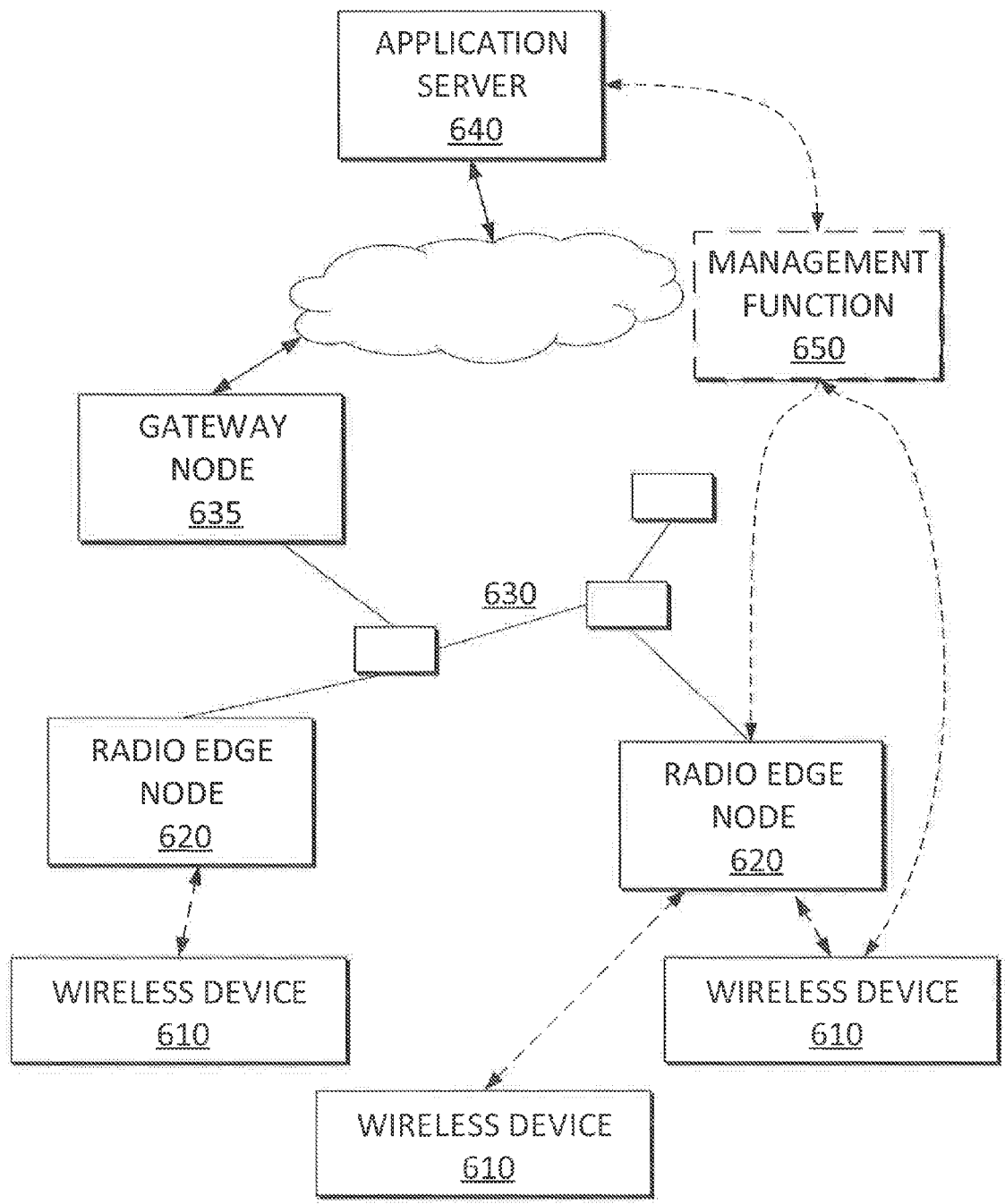
FIG. 6 illustrates a wireless communication network operating environment of embodiments of the present invention.

FIG. 6 illustrates a wireless communication network operating environment of embodiments of the present invention. One or more wireless devices 610 are provided which are communicatively coupled to one or more radio edge node s 620 via wireless radio links. The radio edge node s 620 may further be communicatively coupled via a backhaul network 630 to other network nodes, such as Gateway nodes 635. The Gateway nodes 635 may be further communicatively coupled via an external data network to other network nodes such as Application Servers 640. Remote corresponding applications as described herein may be hosted on application servers 640 and/or nodes in the backhaul network 630.

In some embodiments, the wireless communication network shown in FIG. 6 may further include a management function 650 to facilitate configuration of the TRB and/or the transport proxy. The management function 650 may interact with one or more of the application server 640, wireless device 610, and radio edge node 620. The management function 650 may be deployed as a separate network element, or may be incorporated into an application server, a radio edge node, or another network element.

Figure 7:
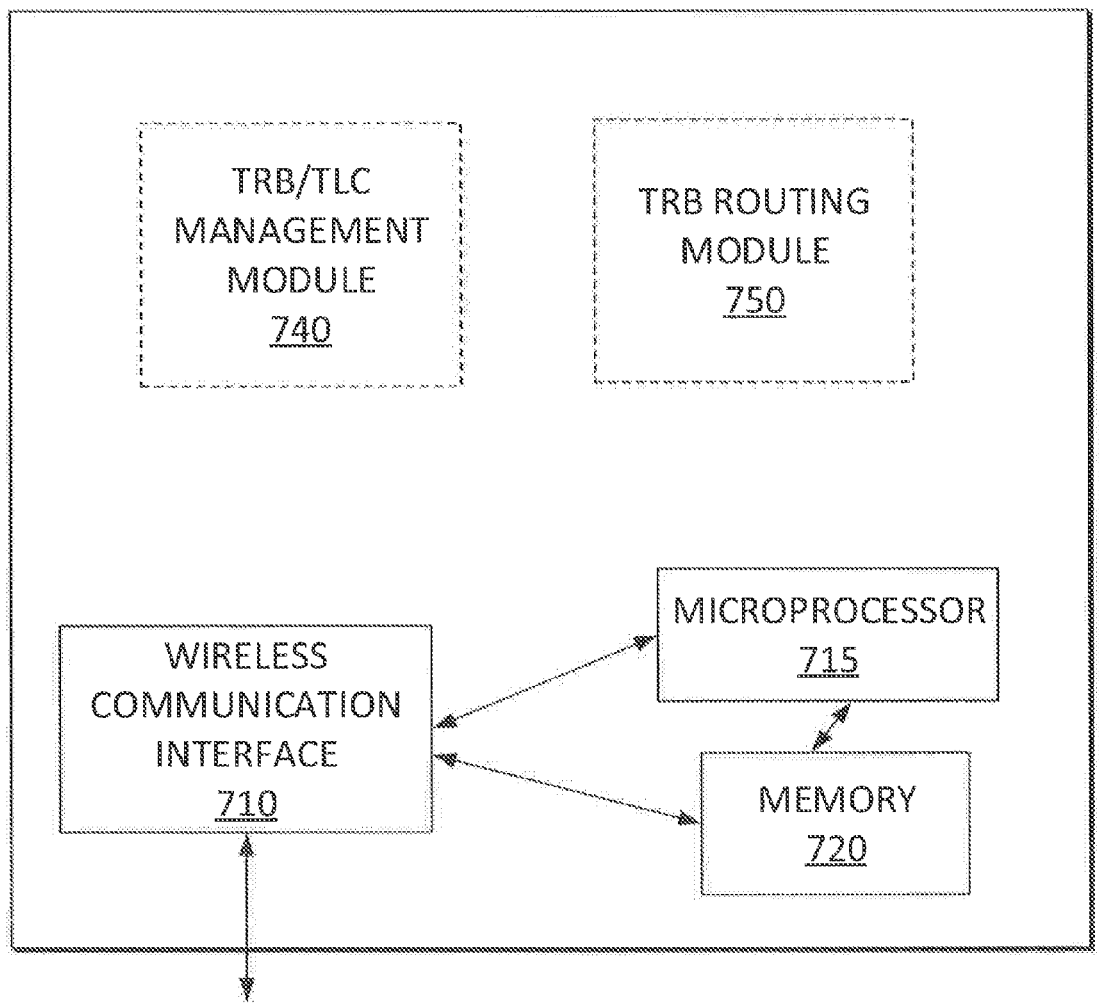
FIG. 7 illustrates a wireless device provided in accordance with an embodiment of the present invention.

FIG. 7 illustrates a wireless device provided in accordance with an embodiment of the present invention. The apparatus includes a wireless communication interface 710, a microprocessor 715 and a memory 720. The wireless communication interface includes a radio transceiver, including baseband and radiofrequency sections. PHY and MAC layer operations can be carried out by the wireless communication interface, for example via data processing and/or signal processing components thereof. The microprocessor executes program instructions stored in the memory, for example to implement a hosted application. The microprocessor interacts with the wireless communication interface in order to transmit data from the hosted application and/or receive data for use by the hosted application. The wireless communication interface and/or microprocessor may be configured, for example by program instructions stored in memory, to perform various operations as described herein. For example, these components may establish TRBs and TLCs, make determinations to establish TRBs and TLCs, etc.

FIG. 7 further illustrates various functional modules which are implemented by operation of the wireless communication interface and/or microprocessor operatively coupled to memory. The functional modules include a TRB/TLC management module 740 configured to manage instantiation and/or de-instantiation of the TRBs and TLCs, and a TRB routing module 750 configured to manage usage of the instantiated TRBs.

The management module 740 is configured to instantiate a transparent radio bearer configured to interface with an application. The management module 740 is further configured to instantiate a transparent logical channel configured to interface with a medium access layer of the device, the medium access layer forming part of a chain of protocol layers operatively configured to facilitate wireless data communication. The management module 740 may perform instantiation functions upon instruction by an application, or may further be configured to determine when such instantiation functions are required. The management module may operate for example by interacting with an existing interface between applications and upper-Layer 2 protocols to instantiate TRBs therein, and by interacting with an existing interface between upper-Layer 2 protocols and lower-Layer 2 protocols to instantiate TLCs therein.

The routing module 750 is configured to select whether to utilize the instantiated transparent radio bearers for use in supporting a given data communication, or alternatively whether to utilize the portion of the chain of protocol layers for the data communication. The routing module 750 can therefore direct, via a control interface, the application and/or lower-Layer 2 protocols to utilize a transparent radio bearer, or alternatively to utilize a conventional radio bearer which does not bypass upper-Layer 2 protocols. In embodiments where multiple TRBs arc instantiated, routing module 750 may further determine which of the available TRBs to use. The selected TRB may then be coupled to one of the TLCs or, in the case of a multicast TRB, to one or more TLCs.

Figure 8:
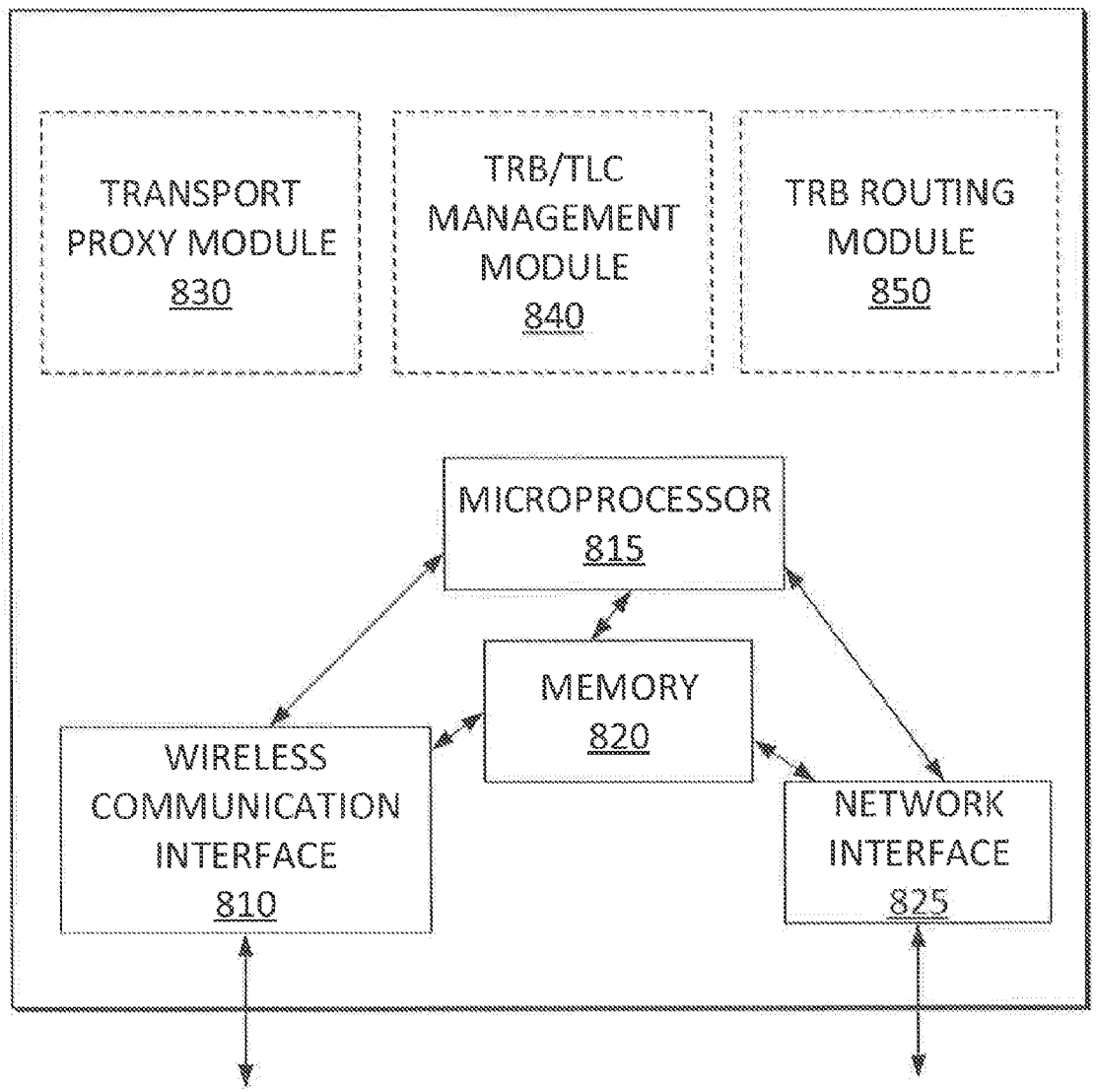
FIG. 8 illustrates a radio edge node provided in accordance with an embodiment of the present invention.

FIG. 8 illustrates a radio edge node provided in accordance with an embodiment of the present invention. The apparatus includes a wireless communication interface 810, a microprocessor 815, a computer memory 820, and a network interface 825. The wireless communication interface includes a radio transceiver, including baseband and radiofrequency sections. The microprocessor executes program instructions stored in the memory, for example to implement a local application or transport proxy. The wireless communication interface and/or microprocessor may be configured, for example by program instructions stored in memory, to perform various operations as described herein. For example, these components may establish TRBs and TLCs, make determinations to establish TRBs and TLCs, etc. The microprocessor may be configured, by program instructions stored in memory, to implement a transport proxy. The network interface is configured to communicate with remote applications via a network, such as a backhaul network and/or external IP network.

FIG. 8 further illustrates various functional modules which are implemented by operation of the wireless communication interface and/or microprocessor operatively coupled to memory. The functional modules include an optional transport proxy module 830 configured to communicate with a remote application as described elsewhere herein, a TRB/TLC management module 840 configured to manage instantiation and/or de-instantiation of the TRBs and TLCs, and a TRB routing module 850 configured to manage usage of the instantiated TRBs. Both the management module 840 and the routing module 850 operate as described above with respect to FIG. 7.

For completeness, it is noted that, for the above-described apparatus illustrated in FIGS. 7 and 8, data provided to the transparent logical channel from the medium access layer is passed to the transparent radio bearer for provision to the application, data provided to the transparent radio bearer from the application is passed to the transparent logical channel for provision to the medium access layer, or a combination thereof. In certain embodiments, the data provided to the transparent logical channel from the medium access layer is passed directly to the transparent radio bearer for provision to the application, and the data provided to the transparent radio bearer from the application is passed directly to the transparent logical channel for provision to the medium access layer, or a combination thereof.

Various methods as disclosed herein may be implemented on one or more real or virtual computing devices, such as devices within a communication network control plane, devices operating in the data plane, or a combination thereof. Computing devices used to implement operations as described herein may include a processor operatively coupled to memory, the memory providing instructions for execution by the processor to perform the method as described herein. Alternatively to a microprocessor executing instructions stored in computer memory, other control means, such as application specific integrated circuits, electronic hardware and/or firmware may be provided to implement this task. Various methods may be performed at least in part using baseband processing functionalities of a wireless communication interface, such as digital signal processing electronics, Application Specific Integrated Circuits, dedicated microprocessors executing software or firmware instructions, or a combination thereof.

In some embodiments, radio edge node s can be configured with sufficient functionality to enable the instantiation of a device as described herein on an as-needed basis according to current processing requirements. The radio edge node and supporting functions such as the Transport Proxy may be realized as virtual network functions (VNFs) within a Network Function Virtualization (NFV) framework. For example, a VNF corresponds to a function enabling operation of a communication network. For example a VNF can provide the functions of a cache, cache controller, router, switch, gateway, firewall, load balancer, server, mobility management entity, and the like. The function is virtualized in the sense that it may share a set of hardware resources, such as computing, storage and networking resources, with other VNFs rather than utilizing dedicated hardware resources. As such, VNF may be instantiated on an as-needed basis using available hardware resources. NVF and virtual network functions architecture is described in ETSI GS NFV-SWA 001, for example.

Various embodiments of the present invention utilize real anchor virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may he used to provide one or more virtual computing machines. Computer hardware, such as processor resources, memory, and the like, may also be virtualized in order to provide resources from which further virtual computing machines are built. A set of computing resources which may be allocated to provide various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for facilitating communication by a device via a wireless communication system configured for data transmission, the method comprising:
   instantiating, in the device, a transparent radio bearer configured to interface with an application of the device; and
   instantiating, in the device, a transparent logical channel configured to interface with a medium access layer of the device, the medium access layer forming part of a chain of protocol layers operatively configured to facilitate wireless data communication with another device,
   wherein the transparent radio bearer maps onto the transparent logical channel in order to bypass at least one sub-layer of the chain of protocol layers while conveying data between the application and the medium access layer.

2. The method of claim 1 wherein the data is provided to the transparent logical channel from the medium access layer and passed to the transparent radio bearer for provision to the application, or provided to the transparent radio bearer from the application and passed to the transparent logical channel for provision to the medium access layer.

3. The method of claim 2, wherein the data provided to the transparent logical channel from the medium access layer is passed directly to the transparent radio bearer, or the data provided to the transparent radio bearer from the application is passed directly to the transparent logical channel for provision to the medium access layer.

4. The method of claim 1, wherein the device is a radio edge node, and wherein the application is a local application hosted on computing hardware co-located with the radio edge node.

5. The method of claim 1, wherein the device is a Radio edge node and wherein the application is a remote application hosted on computing hardware separate from the Radio edge node, the method further comprising providing a transport proxy configured to: encapsulate and transmit said data for provision to the application via a data network; de-encapsulate further data received from the application via the data network for provision to the transparent radio bearer, or both.

6. The method of claim 1, wherein the transparent radio bearer and the transparent logical channel bypass a portion of the chain of protocol layers, the method further comprising, for a given data communication, selecting whether to utilize the transparent radio bearer for the data communication or to utilize the portion of the chain of protocol layers for the data communication.

7. The method of claim 1, wherein the data is mapped directly onto radio resources provided by a physical (PHY) layer of a radio link of the wireless communication system.

8. The method of claim 7, wherein the data mapped directly onto radio resources comprises one or both of: transmit information corresponding to said data provided to the transparent radio bearer from the application; and receive information corresponding to said data provided to the transparent logical channel from the medium access layer.

9. The method of claim 1, wherein the transparent radio bearer is an indicator transparent radio bearer configured to map a single bit of the data to a physical (THY) layer on-off signal via the transparent logical channel.

10. The method of claim 1, wherein the transparent radio bearer is a block transparent radio bearer configured to map a plurality of bits of the data to one or more physical (PHY) layer signals via the transparent logical channel.

11. The method of claim 1, wherein the transparent radio bearer and the transparent logical channel bypass a portion of the chain of protocol layers, the method further comprising performing one or more functions of the bypassed portion of the chain of protocol layers by the application.

12. An apparatus for transmitting data via a wireless communication system, the apparatus comprising:
   a processor;
   a wireless communication interface coupled to the processor; and
   a memory communicatively coupled to the processor, the memory having stored thereon machine readable code which when executed by the processor performs the steps of:
      instantiating a transparent radio bearer configured to interface with an application operating on the apparatus; and
      instantiating a transparent logical channel configured to interface with a medium access layer of the apparatus, the medium access layer forming is part of a chain of protocol layers operatively configured to facilitate wireless data communication with another device across the wireless communication interface;

wherein the transparent radio bearer is mapped onto the transparent logical channel in order to bypass at least one sub-layer of the chain of protocol layers while conveying data between the application and the medium access layer of the apparatus.

13. The apparatus of claim 12 wherein the data is provided to the transparent logical channel from the medium access layer and passed to the transparent radio bearer for provision to the application, or provided to the transparent radio bearer from the application and passed to the transparent logical channel for provision to the medium access layer.

14. The apparatus of claim 13, wherein the data provided to the transparent logical channel from the medium access layer is passed directly to the transparent radio bearer, or the data provided to the transparent radio bearer from the application is passed directly to the transparent logical channel.

15. The apparatus of claim 12, wherein the apparatus corresponds to a radio edge node, and wherein the application is a local application hosted on computing hardware co-located with the radio edge node.

16. The apparatus of claim 12, wherein the apparatus corresponds to a radio edge node, and wherein the application is a remote application hosted on computing hardware separate from the radio edge node the apparatus further comprising a network interface and a transport proxy module configured to: encapsulate and transmit said data for provision to the application via the network interface; de-encapsulate further data received from the application via the network interface for provision to the transparent radio bearer, or both.

17. The apparatus of claim 12, wherein the transparent radio bearer and the transparent logical channel bypass a portion of the chain of protocol layers, the apparatus further comprising a routing module configured, for a given data communication, to select whether to utilize the transparent radio bearer for the data communication or to utilize the portion of the chain of protocol layers for the data communication.

18. The apparatus of claim 12, wherein the data is mapped directly onto radio resources provided by a physical (PHY) layer of a radio link of the wireless communication system.

19. The apparatus of claim 18, wherein the data mapped directly onto radio resources comprises one or both of: transmit information corresponding to said data provided to the transparent radio bearer from the application; and receive information corresponding to said data provided to the transparent logical channel from the medium access layer.

20. The apparatus of claim 12, wherein the transparent radio bearer is an indicator transparent radio bearer configured to map a single bit of the data to a physical (PHY) layer on-off signal via the transparent logical channel.

21. The apparatus of claim 12, wherein the transparent radio bearer is a block transparent radio bearer configured to map a plurality of bits of the data to one or more physical (PHY) layer signals via the transparent logical channel.

22. The apparatus of claim 12, wherein the transparent radio bearer and the transparent logical channel bypass a portion of the chain of protocol layers, wherein one or more functions of the bypassed portion of the chain of protocol layers are performed by the application.

* * * * *

UNITED STATES PATENT AND TRADEMARK OFFICE
CERTIFICATE OF CORRECTION

PATENT NO. : 9,819,463 B2  
APPLICATION NO. : 15/047231  
DATED : November 14, 2017  
INVENTOR(S) : William Anthony Gage and Aaron Callard Page 1 of 2

It is certified that error appears in the above-identified patent and that said Letters Patent is hereby corrected as shown below:

In the Drawings

Figure 4, Sheet 7 should include --417-- at the top of the figure

In the Specification

Column 3, Line 44 "controller An" should read --controller. An--

Column 4, Line 36 "(PRY)" should read --(PHY)--

Column 4, Line 55 "not shown)" should read --(not shown)--

Column 6, Line 29 "a sub-" should read --a PDCP sub--

Column 6, Line 30 "fluffier" should read --further--

Column 7, Line 58 "TIRE" should read --TRB--

Column 7, Line 63 "PITY" should read --PHY--

Column 7, Line 64 "PRY" should read --PHY--

Column 8, Line 53 "APHY" should read --A PHY--

Column 14, Line 64 to Line 65 "utilize real anchor" should read --utilize real and/or anchor--

Signed and Sealed this  
Thirteenth Day of February, 2018

Andrei Iancu  
*Director of the United States Patent and Trademark Office*

CERTIFICATE OF CORRECTION (continued)
U.S. Pat. No. 9,819,463 B2

In the Claims

Column 16, Line 39 Claim 9 "THY" should read --PHY--

Column 16, Line 64 Claim 12 "forming is part of" should read --forming part of--